April 16, 1963 E. O'SULLIVAN 3,085,700
VEHICLE STORAGE APPARATUS
Filed Jan. 3, 1961 4 Sheets-Sheet 1

Inventor
Eugene O'Sullivan
By
Watson, Cole, Grindle & Watson
Attorneys

April 16, 1963 E. O'SULLIVAN 3,085,700
VEHICLE STORAGE APPARATUS
Filed Jan. 3, 1961 4 Sheets-Sheet 2

Inventor
Eugene O'Sullivan
By Watson Cole Grindle & Watson
Attorneys

April 16, 1963 E. O'SULLIVAN 3,085,700
VEHICLE STORAGE APPARATUS
Filed Jan. 3, 1961 4 Sheets-Sheet 3

Inventor
Eugene O'Sullivan
By Watson Cole Grindle & Watson
Attorneys

Eugene O'Sullivan, Inventor

By Watson Cole Grindle & Watson, Attorneys

United States Patent Office 3,085,700
Patented Apr. 16, 1963

3,085,700
VEHICLE STORAGE APPARATUS
Eugene O'Sullivan, Cedarwood, Orpington Road,
Chislehurst, Kent, England
Filed Jan. 3, 1961, Ser. No. 80,333
2 Claims. (Cl. 214—16.1)

The present invention relates to vehicle storage apparatus and particularly to vehicle garaging apparatus where the vehicles are accommodated in vertically movable cages resting one upon the other in vertical columns and including means for transferring the cages laterally from one column to the other at the top and bottom so that the cages in two columns can execute a circulatory movement whereby an empty cage may be brought to a vehicle receiving point and a vehicle already in a cage may be brought to a discharging point.

Apparatus of this character is described for example in British Patent No. 693,170 where the vertical movement of the cages resting upon one another is obtained, in the preferred embodiment, by hydraulic devices and the superimposed cages lying above the level of the receiving and discharging points, are retained by support mechanism so that a cage lying beneath said support mechanism may be transferred on suitable support rails from the base of one column to a vacant space at the base of another column and at the same time a cage disposed at the top of the other column may be transferred laterally to a vacant space at the top of the first named column.

The present invention is more particularly concerned with the provision of means arranged at the tops of the columns for transferring the cage from the top of one column to the top of another column and in accordance with the present invention the transfer of the cage at the top of one column to a vacant space at the top of the other column is performed by means of a carriage having opposed pairs of depending claw members with hook shaped operative end parts adapted to engage transverse members on the cages, said claw members overlapping one another to provide a self-retaining engagement between the claw members and the transverse members to support the cage during its transfer from one column to the other.

Said pairs of claw members may be operated towards engagement and disengagement positions by engagement of an operating member with the cage so that a cage which is to be supported by said carriage is first entered between the claw members while in the open position and the claw members are thereafter brought to the engagement position before the cages are slightly lowered to allow the uppermost cage to be supported by said claw members, while for disengagement of the conveyed cage when it reaches the top of the other column said column is caused to make a slight upward movement which releases the cage from engagement with the claws and then opens said claw members to allow the column of cages including the uppermost cage to be lowered.

The cages may be formed by a panelled lattice structure having a substantially central thrust frame designed to provide a major contribution to the strength of the cage sufficient for the lowermost cage in the column to support the weight of all the loaded cages above it.

The support mechanism for the cages lying immediately above the level containing the lowermost cage comprise ratchet-like members positioned to allow a cage at the lowermost level to move freely between the base of one column and the base of the other column, the movement of said lowermost cage being in the opposite direction to the movement of the top carriage conveying the uppermost cage in said other column to the top of the first column.

Hydraulic ram or equivalent means are adapted to perform the lifting and lowering of the two columns of cages, said hydraulic rams being controlled and operated to raise and lower the cages in the columns by engagement with the lowermost cage.

One embodiment of vehicle storage apparatus according to the present invention is shown on the accompanying drawings wherein.

In the apparatus shown on the accompanying drawings a fixed support structure, represented by vertical main frame members 8, is provided suitably supported on foundations 9, said frame comprising vertical angle members at the corners, which are suitably braced and supported as indicated at 10, and similar members intermediately.

Figure 2:
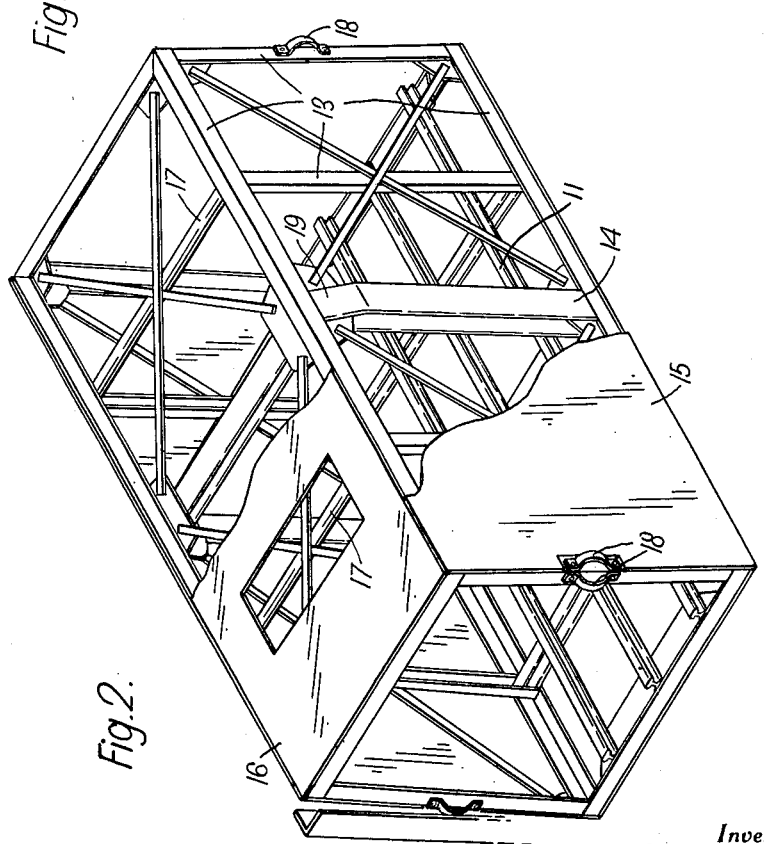
FIG. 2 is an enlarged perspective view showing the construction of each of the cages.

This frame serves as a vertical guide for two columns of vertically movable cages 12 each constructed as shown on FIG. 2. Each such cage may be formed from suitably braced steel sections, various parts of which are indicated generally by 13, and a centrally positioned thrust frame 14 which is designed to contribute a major part of the strength of the cage, bearing in mind that a number of said cages, each of which may be loaded with a motor vehicle, may rest one upon the other so that the lowermost cage has a support the weight of all the cages which may be placed above it. The cages may be partially or wholly enclosed by panel members 15, while the floor is provided with rails 11. The top surface may be covered by a ceiling panel 16. If desired the space between the rails 11 may be covered with a suitable decking.

Transverse top members 17 placed symmetrically on the two sides of the central thrust frame 14 are provided for engagement by claw members 38, 39 on a top transfer carriage 35; the ceiling panel 16 may be suitably recessed or cut away to allow for engagement of the claw members with the transverse members as explained hereinafter. The cages are provided at their side edges with projecting members 18 adapted to run in sliding engagement with the vertical members 8 of the main frame so that the cages are appropriately guided laterally while executing the vertical movement in the columns.

The thrust frame members 14 are tapered inwardly slightly at their upper edges as indicated at 19 to allow for the engagement of the cages by ratchet-like support members 21 carried by strong bearer members 22 of the main framework. These members 21 are provided for both columns and serve to support the cages other than a cage at the lowermost level, namely the cage 121 in FIGS. 1 and 3. The ratchet members 21 are adapted to be moved into and out of the engagement position by means of suitable power-operated devices, for example air-operated or hydraulically-operated rams or cylinders 23 (FIG. 4) and said ratchet members may be urged towards the engagement position by means of springs 24. The ratchet members 21 are each pivotally connected to a link member 211 which in turn is connected to one arm of a bell crank 212, the other arm of which is connected to an air-operated or hydraulically operated ram of cylinder 23 (FIG. 4). A spring 24 is provided connected to the bell crank 212 so as to tend to move the ratchet member 21 into the engagement position shown in FIG. 3. When the ratchet members 21 are to be moved to inoperative positions air or hydraulic fluid is admitted to the ram or cylinder 23 pertaining to the ratchet member concerned to rotate the bell crank 212 in the clockwise direction and thereby, through the link 211, to pull the ratchet member 21 clear of the thrust frame members 14 of the cages, this alternative position being shown in chain dot lines in FIG. 3.

Figure 1:
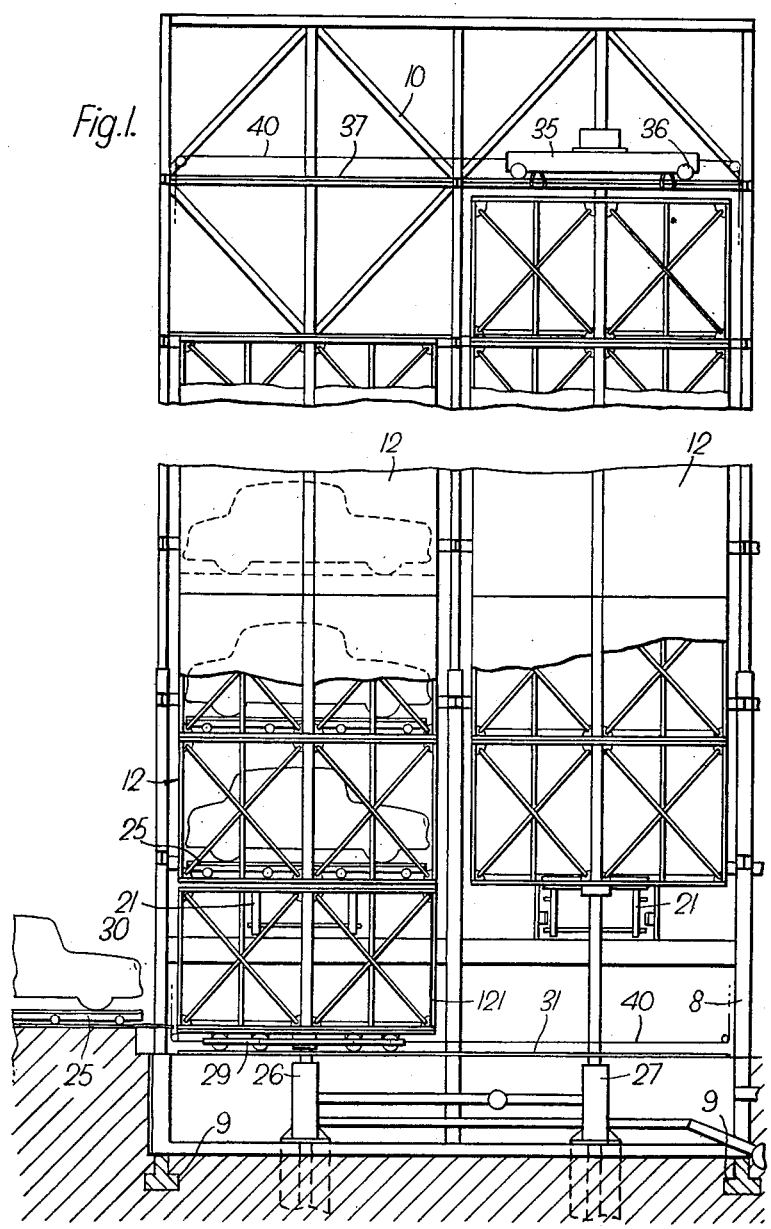
FIG. 1 is a side view of the apparatus in a somewhat diagrammatic form.
Figure 3:
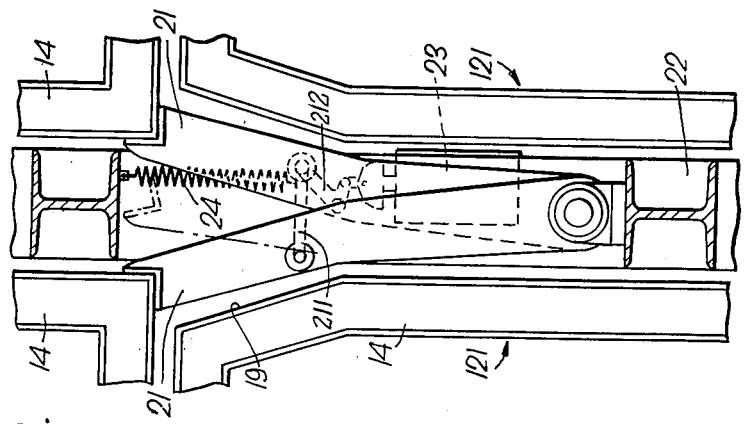
FIG. 3 is a cross-sectional partial view showing the arrangement of the support mechanism for the cages one resting upon the other, said figure further indicating how two apparatus units may be arranged side-by-side with a common mounting for the support mechanism pertaining to the two units.
Figure 4:
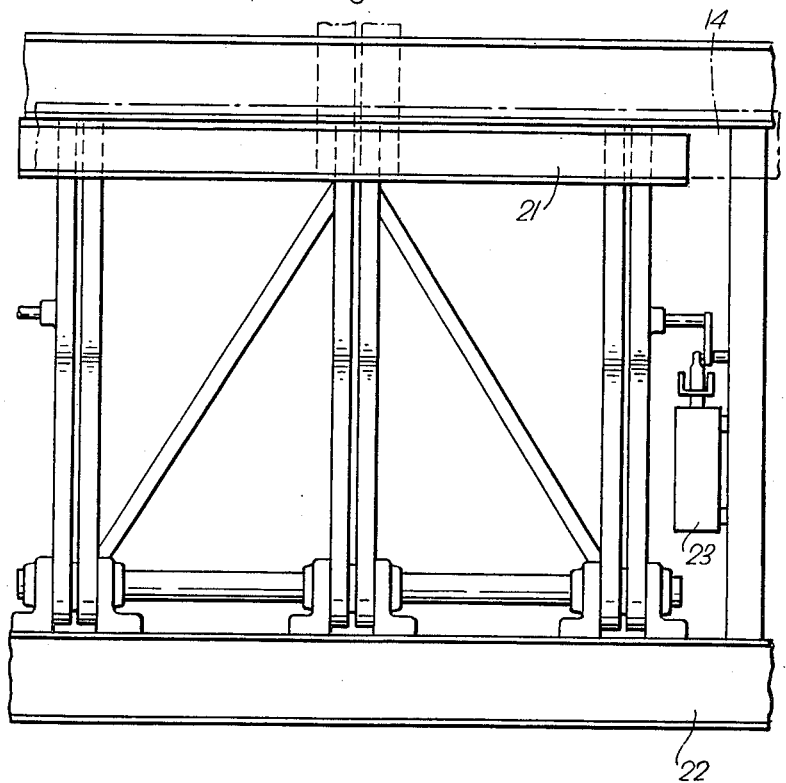
FIG. 4 is an elevation view of FIG. 3.

It will, of course, be understood that a number of two-column units as shown in FIG. 1 may be arranged one beside the other and the mounting of the pairs of ratchet members 21 shown in FIG. 3 is intended for an arrangement where two such units are arranged side-by-side. The ratchet members 21 pertaining to the two units are mounted on a common shaft supported by the bearer members 22, each ratchet member being controlled by its own operating cylinder 23. With reference to the air cylinder 23 in FIGS. 3 and 4, the body is bolted to the upright shown in FIG. 4. It operates a bell crank 212 the upper end of which is linked by member 211 to the ratchet support 21, namely, the ratchet member on the lefthand side of FIG. 3. FIG. 3 shows how the tapered parts 19 of the thrust frames 14 permit angle-shaped tip parts of the ratchet members to engage the piled cages above the lowermost level cage 121, leaving the latter free to move laterally from one column to the other.

Although for convenience the two vertical columns of one unit are shown in FIG. 1 as being arranged immediately adjacent one another, it should be understood that this arrangement is not essential as the two vertical columns could be spaced apart, for example, by an amount sufficient to accommodate chambers into which vehicles, carried upwardly by the cages 12, can be inserted for storage purposes, and said receiving chambers may be provided both in pairs between the vertical columns and on one or both sides of the unit, i.e., to left and/or right of FIG. 1.

The vehicles to be stored in the cages are preferably first run on to platform members 25, which, together with the vehicles thereon, are then inserted in the cages. This arrangement is advantageous as it permits the cages to be made smaller than would otherwise be possible because the driver can disembark when the vehicle reaches the platform and thus the cage does not have to be made large enough for the vehicle doors to be opened while in the cage. Such platforms are preferably provided with mechanically operated chocks to prevent inadvertent movement of the vehicles.

Hydraulic ram devices 26, 27 are provided beneath the two vertical columns concerned and are controlled and operated to raise the cages in one column while the cages in the other column are being lowered.

The operation of the mechanism so far described is briefly as follows: a vehicle to be garaged is run on to a platform 25 and, assuming an empty cage (the cage 121) is available in front of the loading point 30, as is shown in FIG. 1, the platform 25 is run into the cage by means of a suitable power-operated device and then the mechanism is operated to perform the circulatory movement of the cages. In one direction the rams 26 and 27 are operated respectively, (*a*) to raise that cage, and all the cages above it, to the extent of the height of one cage, and (*b*) to lower all the cages in the other column. The uppermost cage in the first column (of ram 26) is then transferred in the manner to be described to the top of the second column (of ram 27) and, simultaneously, the cage now at the bottom of the second column is shifted in the opposite direction laterally to the loading position 30 below the first column, ready to receive the next vehicle. This involves circulatory movement of the cages in one direction, but it will, of course, be understood that the apparatus may be reversed in operation to cause circulation of the cages in the opposite direction.

As the lowermost cage in the rising column is moved upwardly by the ram 26, the ratchet members 21 drop into position beneath the base of the cage, thus retaining that column of cages in their new position. The lowermost cage in the column which is to move down makes an initial upward movement to permit release of the ratchet member 21 by the cylinder 23 and to release the claw members 38 and 39 as explained below. The circulatory movement of the cages involves the lateral movement of the top cage in the rising column to the top of the other column and the movement of the lowermost cage in the said other column to the bottom of the first column. The latter movement is possible because the cage above the lowermost descending cage is held by the respective ratchet members 21, whereas the lowermost cage continues its downward movement to a small extent until it rests on a carriage 29 running on rails 31. To effect the transfer of the top cage in the first column to the top of the second column the features now to be described are provided.

The carriage 35 is mounted at the top of the columns, and has support wheels 36 running on rails 37. The carriage 35 comprises spaced pairs of claw members 38, 39 each of hooked shape as shown on the drawings so that when they are engaged with the cross bars 17 the engagement is of a self-retaining character not liable to be dislodged by movement of the carriage or vibration of the cage. The top cage, while supported by said claw members, may then be shifted by bodily movement of the carriage 35, this movement being obtained for example by means of a chain 40 which is guided in an endless path up one frame member 8, then parallel to the rails 37 then down another frame member 8 and across the base of the two columns where the chain is fixed to the carriage 29 to effect the lateral movement thereof at the same time that the carriage 35 is moved in the opposite direction.

Figure 7:
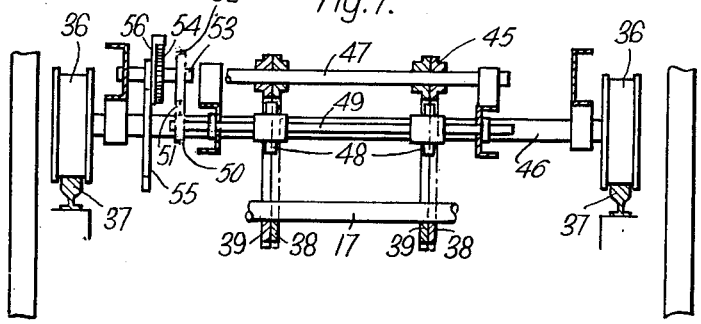
FIG. 7 is a cross-sectional view showing the arrangement of the top carriage.

FIG. 7 illustrates in cross-section the arrangement of the carriage 35. The carriage comprises side frame members 45 conveniently of channel section to which cross shafts 46 are mounted towards each end to carry the wheels 36 which run upon the rails 37 shown on FIG. 1.

Figure 5:
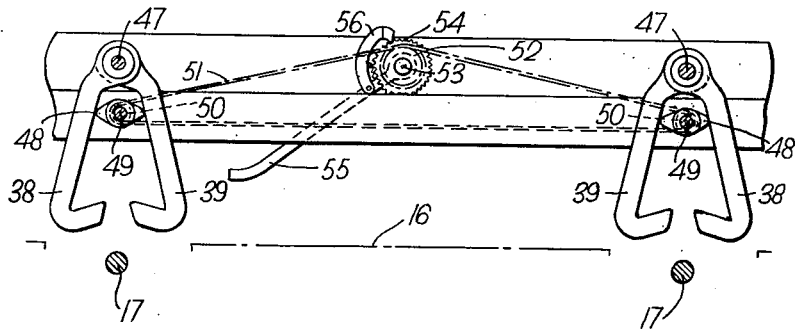
FIGS. 5 and 6 are explanatory views showing the engagement and disengagement means on the top carriage for transferring the cages from the top of one column to the top of the other column.
Figure 6:
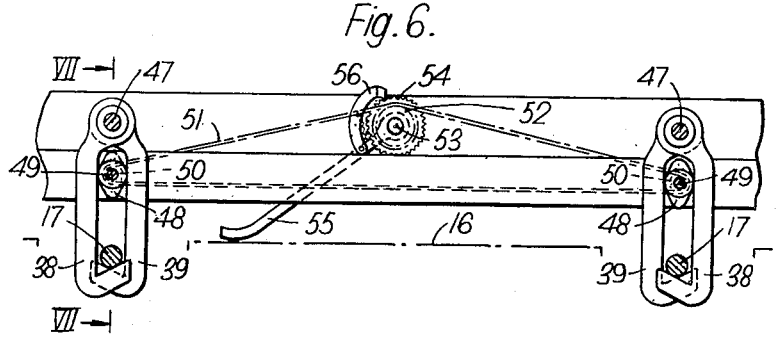

Pairs of claw members 38, 39 are freely pivotally mounted upon cross bars 47 extending between the frame members 45 and two-lobed cams 48 are also mounted on rotatable cross shafts 49 positioned between the adjacent pairs of claw members 38, 39. The shafts 49 carrying the two-lobed cams 48 carry chain sprocket wheels 50 around which the chain 51 is passed. This chain also passes over a chain sprocket wheel 52 on a further cross shaft 53 which carries a ratchet wheel 54. Freely mounted on the shaft 53 is a depending arm 55 which may be obliquely positioned as shown in FIGS. 5 and 6 for ready engagement by the top surface of the uppermost cage. A pawl 56 is pivoted to the lever 55 and is subjected to the action of gravity or a spring which maintains engagement of the pawl 56 with the ratchet wheel 54 so that on upward movement of the uppermost cage into engagement with the lever 55, continuing slight upward movement of the cage rotates the lever 55, the ratchet wheel 54 and the chain sprocket wheel 52, to move the chain 51 and to rotate the cams 48 to the operative positions, respectively shown in FIGS. 5 and 6, on successive engagement with the cage. Thus on the upward approach movement of a cage towards the claw mechanism shown in the FIG. 5 position, the lever 55 is actuated and the cams 48 rotate to the FIG. 6 position to allow the claw members 38, 39 to close on to the cross bars 17 thereby to retain the uppermost cage and permit said cage to be shifted from the top of one column to the top of another column with the claw members 38, 39 now in the FIG. 6 position. When this new position has been reached release of the cage may be effected by a further slight upward movement of the cage which again actuates the lever 55 to open the claw members 38, 39, it being understood that the slight upward movement of the cage releases the cross members 17 from locking engagement with the claw members so that the latter may be moved by the cams 48 to the disengaged position shown in FIG. 5.

On FIG. 1 the chain 40 is shown for convenience as lying within the structure supporting the cages 12, but it will be understood that in practice such chain is suitably concealed by the vertical frame members of the structure and a suitable power drive, not shown, is provided for moving the chain 40 alternately in different directions so that the carriages 29 and 35 are moved backwards and forwards alternately in opposite directions.

A suitable automatic control system is provided to provide for co-related operation of the hydraulic rams 26 and 27 and the driving means for the chain 40. Starting from the position shown in FIG. 1 it will be seen that an empty cage 121 is placed at the receiving point 30 and the cages of both columns are supported by the respective ratchet members 21.

The platform 25 is run into the cage 121 and then the ram 26 is operated to lift the left-hand column until the cage 121 is held by the ratchets 21. Thereafter the rams 26 and 27 are lowered and the carriages 29 and 35 moved respectively to the bottom of the right-hand column and to the top of the left-hand column prior to the transfer operations now to be described. To effect the transfer of the cage from the left-hand column to the right-hand column with the carriage 35 now in its left-hand position the ram 26 executes a further upward movement to engage the claw members 38, 39 on the cross members 17. At the same time the ram 27 may be raised to lift the right-hand column slightly to disengage the ratchet members 21 after which the right-hand column may be lowered so that the lowermost cage is supported by the carriage 29, the cage above the lowermost cage being again held by the ratchet members 21.

The carriages 29 and 35 may now be shifted back to the starting position shown in FIG. 1, transferring the top cage from the left-hand column to a position above the right-hand column and shifting the bottom cage from the right-hand column to the left-hand column. Thereafter the right-hand column may execute a further upward movement by the action of the ram 27 to disengage the claw members 38, 39 from the top cage, thus reverting to the position shown in FIG. 1. As the left-hand column completes its upward movement the respective ratchet members 21 fall into position beneath the lowermost cage 12 (that marked 121), but the column of cages continues to move upwardly to a slight extent to permit the cross members 17 to enter between the open claws 38, 39 of the carriage 35 previously brought to a position above the left-hand column.

This upward movement is sufficient to permit the upper ceiling member 16 of the uppermost cage 12 to actuate the lever 55 to close the claw members 38, 39 on to the transverse members 17.

The ram 26 now commences its idle return movement towards the position shown in FIG. 1, the column of cages being now supported by the ratchet members 21 except for the uppermost cage which is now suspended slightly clear of the cage immediately beneath it.

Meanwhile during the rising motion of the ram 26 the other ram 27 is being lowered. Before this occurs the ratchet members 21 pertaining to the right-hand column have been released following the slight initial upward movement of the ram 27 to release the ratchet members so that the right-hand column of cages 12 has been lowered. Meanwhile the carriage 29 is brought to a position beneath the right-hand column and the ratchet members 21 pertaining to that column are again put in the operative position ready to engage the cage above the lowermost cage which now reaches the carriage 26 and is clear of the cages above it, as indicated on FIG. 1 for the left-hand column. The lowermost cage at the bottom right-hand column may now be shifted to the base of the left-hand column at the same time that the top cage supported by the carriage 35 is shifted from the top of the left-hand column to the top of the right-hand column.

By continuing this movement in one direction or the other a succession of vehicles can be placed in empty cages as they reach the receiving point 30 or alternatively vehicles already in the cages may be withdrawn either at the same receiving point 30 (which thus serves both as a receiving and discharge point) or alternatively a separate discharging point may be provided at the opposite side of the unit at ground level.

Automatic control means of a suitable character may of course be provided to ensure that an unoccupied cage is brought to the receiving point 30 and said control means may further be organised so that the cage containing any selected vehicle may be brought to the discharge point when required.

What I claim is:

1. Vehicle cage transfer apparatus for shifting the uppermost cage from one column to the top of an adjacent column, comprising a frame structure housing said columns of cages, a carriage slidably supported on said structure to transfer a cage from one column to an adjacent column, transverse members on each cage, opposed pairs of claw members pivotally mounted on said carriage for engagement with the transverse members on the cages, a depending actuating arm mounted on said carriage, operative linkage means connecting said actuating arm to means for displacing said claw members from an operative engaging position in respect to said transverse members or to an inoperative position thereto to allow the transverse members to move inwardly between said claw members and thereafter to cause said claw members to move to an engaging position to support said cage and on a further inward movement of said cage to actuate the claw members to an alternative position clear of the downward path of movement of said transverse members to allow the cage to move out of engagement with said claw members.

2. Vehicle cage transfer apparatus according to claim 1, in which a ratchet device and a double cam device are provided so that the actuating arm is operatively linked to the double cam device between each pair of claw members through the ratchet device whereby on successive movements of the actuating arm, the cam device is moved alternately to positions which open the claw members and which close them.

References Cited in the file of this patent
UNITED STATES PATENTS

| | | |
|---|---|---|
| 456,148 | Kinney et al. | July 21, 1891 |
| 643,933 | Bender | Feb. 20, 1900 |
| 1,851,502 | Ferris et al. | Mar. 29, 1932 |
| 2,730,279 | Enock | Jan. 10, 1956 |
| 2,762,489 | O'Sullivan | Sept. 11, 1956 |